United States Patent Office 3,005,804
Patented Oct. 24, 1961

3,005,804
CURING BUTYL RUBBER LATEX FILMS
Alfred L. Miller, Cranford, Anthony J. Petro, Elizabeth, and Kenneth W. Powers, Nixon, N.J., assignors to Esso Research and Engineering Company, a corporation of Delaware
No Drawing. Filed Dec. 17, 1958, Ser. No. 780,942
10 Claims. (Cl. 260—79.5)

This invention relates to the preparation of a vulcanizable gum butyl rubber. It relates more particularly to the preparation of a vulcanizable butyl rubber latex designed for use as films and in the impregnation of articles which are dried out and then heated to a sufficiently elevated temperature to lead to a product associated with butyl rubber in a high state of cure.

It is known to vulcanize natural rubber latices with sulfur in the presence of various accelerators. The same accelerators which are used to vulcanize pigment-loaded stocks are generally suitable for this purpose.

However, when pigment-loaded butyl rubber stocks are vulcanized it has been recognized that the accelerators generally used for natural rubber and synthetic rubbers such as SBR (formerly GRS) are unsuitable. When latices or other gum stocks of butyl rubber are cured, even more difficulty is found and accelerators useful for curing loaded butyl stocks fail to produce a cure in either latex or gum stocks.

In accordance with one embodiment of the present invention, it has now been discovered that latices of butyl rubber can be vulcanized to a high state of cure by the use of zinc diethyldthiocarbamate. Other accelerators give either no cure at all or give vulcanized products which have such poor physical properties as to be unsuited for practical use.

In accordance with another embodiment of the invention, the tensile properties of the vulcanizates obtained by the use of zinc diethyldithiocarbamate are improved by the addition of 2 to 4 parts, per hundred parts of rubber, of an ammonium halide, a polysubstituted amine halide, a polysubstituted ammonium halide, or the zinc salt of mercaptobenzothiazole. Still further improvements in the tensiles can be achieved by allowing the compounded latex to stand for about 24 hours prior to vulcanizing.

The butyl rubber latices used in the practice of this invention are dispersions of vulcanizable elastic copolymers of isobutylene and small amounts of diolefins. Butyl rubber is thus defined in Haakh's Chemical Dictionary, 3rd edition, page 151. Its properties and method of preparation are amply described in "Synthetic Rubber" by Whitby (John Wiley and Sons, 1954), pages 838–891, where it is pointed out that diolefins containing 4 to 6 carbon atoms such as butadiene (methylbutadiene) piperylene and isoprene are suitable for reacting with the isobutylene.

The rubber is prepared as a solid crumb and is converted into a latex by dissolving in a hydrocarbon solvent such as hexane. Latices are suitably prepared from this solution by emulsifying with water in the presence of an alkali metal, alkaline earth metal, amine or ammonium salt of a $C_8$–$C_{11}$ organic sulfate and a monovalent salt of dihydrogen orthophosphate. For example, a typical recipe for the preparation of these latices is as follows:

| | Parts |
|---|---|
| Solution of butyl rubber in hexane (23 wt. % N.V.M.) | 50–70 |
| Water | 50–30 |
| Sodium salt of sulfated nonylphenoxyethoxy ethanol (per 100 parts rubber solids) | 3.5–5 |
| $NaH_2PO_4$ (per 100 parts rubber solids) | 0.5–1 |

Thus in accordance with the preferred embodiment of this invention, these latices of butyl rubber are compounded according to the following recipe:

| | Broad Range | Preferred Range |
|---|---|---|
| Butyl rubber latex solids_____parts__ | 100 | 100 |
| Zinc oxide_____do____ | 1–11 | 2–5 |
| Sulfur_____do____ | 2 | 2 |
| Zinc diethyldithiocarbamate___do____ | 1–6 | 1–3 |
| $NH_4Cl$_____do____ | 1–4 | 2–3 |
| Antioxidant—as desired. | | |

If desired the above typically compounded latex may be aged overnight prior to curing. In any case films are prepared by dipping a form of the latex and drying the dipped films at 160° F. for about one hour. The dried film is then cured at 250°–260° F. for one hour.

The following examples are given to aid in understanding the invention, but it is to be understood that the invention is not limited to the ingredients or proportions set forth in the examples.

Example 1

A butyl latex was prepared by emulsifying a 23% N.V.M. solution of butyl rubber in hexane with water in the presence of 5 parts (per hundred parts of rubber) of the sodium salt of sulfated nonylphenoxyethoxyethanol and 1 part (per 100 parts of rubber) of sodium dihydrogen phosphate. The pH of this latex was adjusted to 9 by addition of $NH_4OH$ and the resulting mix was compounded with various amounts of zinc diethyldithiocarbamate and zinc dimethyldithiocarbamate. Films were then prepared by dipping forms at a rate of 5 inches per minute in three successive dips, each dip being dried for 1 hour at 160° F. After the final dip the films were cured at 250°–260° F. for one hour. The following data were obtained.

| Compound | 1 | 2 | 3 | 4 |
|---|---|---|---|---|
| Latex solids_____pts. by wt__ | 100 | 100 | 100 | 100 |
| ZnO_____do____ | 5 | 5 | 5 | 5 |
| S_____do____ | 2 | 2 | 2 | 2 |
| Ethyl Zimate [1]_____do____ | 2 | 3 | 4 | _____ |
| Methyl Zimate [2]_____do____ | _____ | _____ | _____ | 3 |
| Av. Film Thickness_____mils__ | 15 | 16 | 15 | 18 |
| Tensile [3]_____p.s.i__ | 1,825 | 2,020 | 2,105 | 660 |
| Elongation_____percent__ | 1,035 | 1,040 | 1,010 | 1,300 |

[1] Zinc diethyldithiocarbamate.
[2] Zinc dimethyldithiocarbamate.
[3] Pulled at 10 in./min. at 70° F.

These data show that zinc diethyldithiocarbamate is eminently superior to zinc dimethyldithiocarbamate as an accelerator for curing butyl latex films, the tensile strength of the films cured by zinc diethyldithiocarbamate being about three times greater than the tensile strength obtained with the methyl compound.

Example 2

The latex of Example 1 was compounded with various conventional accelerators used for commercial high unsaturated rubbers known as SBR (formerly GRS), natural rubber, etc. and films formed as before. The following data were obtained:

| Compound | 1 | 2 | 3 | 4 | 5 | 6 |
|---|---|---|---|---|---|---|
| Latex solids....pts. by wt.. | 100 | 100 | 100 | 100 | 100 | 100 |
| ZnO..................do.... | 5 | 5 | 5 | 5 | 5 | 5 |
| S....................do.... | 2 | 2 | 2 | 2 | 2 | 2 |
| Ethyl zimate [1]......do.... | 3 | | | | | |
| Butyl zimate [1]......do.... | | 3 | | | | |
| Zetax [2]..............do.... | | | 3 | | | |
| Altax [3].............do.... | | | | 3 | | |
| Rotax [4].............do.... | | | | | 3 | |
| Accelerator 522 [5]...do.... | | | | | | 3 |
| Ultimate Tensile....p.s.i.. | 2,240 | 1,320 | No cure | No cure | No cure | 1,110 |
| Elongation........percent.. | 1,085 | 1,300+ | | | | 1,200 |

[1] Zimate is zinc dialkyldithiocarbamate.
[2] Zinc salt of mercaptobenzothiazole.
[3] Benzothiazyl disulfide.
[4] Mercaptobenzothiazole.
[5] Piperidinium pentamethylene dithiocarbamate.

The above data show either that no cure was obtained with the usual accelerators or that if a cure was obtained the tensiles were very poor. Of this group only zinc diethyldithiocarbamate was found to cure butyl rubber latex satisfactorily.

*Example 3*

The experiment of Example 1 was repeated except that various amounts of amine hydrochlorides and ammonium chloride were added to the recipe in conjunction with ethyl zimate. The following data were obtained on the cured film:

| Compound | 1 | 2 | 3 | 4 |
|---|---|---|---|---|
| Latex solids..........pts. by wt.. | 100 | 100 | 100 | 100 |
| ZnO..........................do.... | 5 | 5 | 5 | 5 |
| S.............................do.... | 2 | 2 | 2 | 2 |
| Ethyl zimate [1]...........do.... | 1 | 2 | 3 | 3 |
| NH4Cl........................do.... | | | | 2 |
| Tensile.....................p.s.i.. | 2,230 | 2,665 | 2,750 | 3,065 |
| Elongation..............percent.. | 1,195 | 1,045 | 1,065 | 1,015 |

[1] Zinc diethyldithiocarbamate.

| Compound | 1 | 2 | 3 | 4 |
|---|---|---|---|---|
| Latex solids............pts. by wt.. | 100 | 100 | 100 | 100 |
| ZnO..........................do.... | 5 | 5 | 5 | 5 |
| S.............................do.... | 2 | 2 | 2 | 2 |
| Ethyl zimate [1]...........do.... | 3 | 3 | 3 | 3 |
| NH4Cl........................do.... | | 1 | | |
| DEA.HCl [2]................do.... | | | 2 | |
| DCA.HCl [3]................do.... | | | | 2 |
| Tensile.....................p.s.i.. | 2,235 | 2,930 | 2,920 | 2,795 |
| Elongation..............percent.. | 1,010 | 980 | 935 | 925 |

[1] Zinc diethyldithiocarbamate.
[2] Diethylamine hydrochloride.
[3] Dicyclohexylamine hydrochloride.

These data show that the presence of 1–2 wt. percent of an amine hydrochloride or ammonium chloride in a butyl latex film cured with zinc diethyldithiocarbamate greatly increases the tensile strength of the cured film.

*Example 4*

The experiment of Example 3 was repeated except that zetax was added in conjunction with ethyl zimate. The following results were obtained:

| Compound | 1 | 2 | | | 3 | | | 4 | 5 |
|---|---|---|---|---|---|---|---|---|---|
| Latex solids........pts. by wt.. | 100 | 100 | 100 | 100 | 100 | 100 | 100 | 100 | 100 |
| ZnO........................do.... | 5 | 5 | 5 | 5 | 5 | 5 | 5 | 5 | 5 |
| S...........................do.... | 2 | 2 | 2 | 2 | 2 | 2 | 2 | 2 | 2 |
| Ethyl zimate [1].........do.... | 3 | 3 | 3 | 3 | 3 | 2 | | | 0 |
| Zetax [2]..................do.... | 0 | 1 | | | 2 | | 3 | | 3 |
| Cure Temp...............°F.... | 260 | 250 | 260 | 240 | 260 | 240 | 260 | 240 | 260 |
| Tensile..................p.s.i.. | 2,235 | 1,260 | 3,040 | 2,270 | 2,905 | 2,395 | 2,770 | 2,185 | No cure. |
| Elongation...........percent.. | 1,010 | 1,110 | 835 | 1,050 | 810 | 1,020 | 805 | 1,020 | |

[1] Zinc diethyldithiocarbamate.
[2] Zinc salt of mercaptobenzothiazole.

The above results show that the zinc salt of mercaptobenzothiazole promotes the cure of butyl latex with zinc diethyldithiocarbamate, giving stronger films at lower elongation at 260° F. At 240° F. it gives films having strengths equivalent to those at 260° F. without it. At 250° F. without zetax the films are very poor. Run No. 5 shows that no cure is obtained with zetax in the absence of ethyl zimate.

*Example 5*

The experiment of Examle 3 was repeated except that various amounts of sodium chloride and potassium chloride were added to the recipe instead of the NH4Cl and amine salts. The following data were obtained:

| Compound | 1 | 2 | 3 | 4 | 5 | 6 | 7 | 8 |
|---|---|---|---|---|---|---|---|---|
| Latex solids........pts. by wt.. | 100 | 100 | 100 | 100 | 100 | 100 | 100 | 100 |
| ZnO........................do.... | 5 | 5 | 5 | 5 | 5 | 5 | 5 | 5 |
| S...........................do.... | 2 | 2 | 2 | 2 | 2 | 2 | 2 | 2 |
| Ethyl zimate [1].........do.... | 3 | 3 | 3 | 3 | 3 | 3 | 3 | 3 |
| NaCl......................do.... | 0 | 1 | 2 | 3 | | | | |
| KCl........................do.... | | | | | 0 | 1 | 2 | 3 |
| Tensile..................p.s.i.. | 2,650 | 2,740 | 2,665 | 2,330 | 2,560 | 2,500 | 2,400 | 2,320 |
| Elongation...........percent.. | 980 | 980 | 960 | 975 | 995 | 990 | 955 | 965 |

[1] Zinc diethyldithiocarbamate.

These data show that no desirable effect on tensile strength is obtained by the addition of either potassium or sodium chloride.

*Example 6*

Dry gum butyl rubber was press cured in the presence of sulfur and zinc diethyldithiocarbamate with the addition of ammonium chloride and diethylamine hydrochloride in comparative runs. The following data were obtained:

| Compound | 1 | 2 | 3 | 4 | 5 | 6 |
|---|---|---|---|---|---|---|
| Butyl rubber____pts. by wt__ | 100 | 100 | 100 | 100 | 100 | 100 |
| ZnO_____do____ | 5 | 5 | 5 | 5 | 5 | 5 |
| S_____do____ | 2 | 2 | 2 | 2 | 2 | 2 |
| Ethyl zimate [1]_____do____ | 3 | 3 | 3 | 3 | 3 | 3 |
| NH₄Cl_____do____ |  | 1 | 2 |  |  |  |
| DEA.HCl [2]_____do____ |  |  |  | 1 | 2 | 6 |
| Modulus 300%_____p.s.i__ | 115 | 105 | 110 | 130 | 125 | 75 |
| Modulus 500%_____p.s.i__ | 195 | 175 | 190 | 245 | 240 | 155 |
| Tensile_____p.s.i__ | 2,410 | 2,685 | 2,405 | 3,450 | 3,195 | 1,115 |
| Elongation_____percent__ | 875 | 870 | 830 | 865 | 895 | 835 |

[1] Zinc diethyldithiocarbamate.
[2] Diethylamine hydrochloride.

The above data show that while 1% of ammonium chloride results in a slight improvement in the tensile strength, 1 part of the diethylamine hydrochloride is outstanding, the tensile strength increasing from 2410 to 3450. Even two parts gives excellent results.

Example 7

When the experiment of Example 4 is repeated for loaded stocks, the outstanding improvement of diethylamine hydrochloride is no longer obtained as illustrated by the following data:

| Compound | 1 | 2 | 3 | 4 | 5 |
|---|---|---|---|---|---|
| Butyl rubber____pts. by wt__ | 100 | 100 | 100 | 100 | 100 |
| Philblack A_____do____ | 25 | 25 | 25 | 25 | 25 |
| Pelletex_____do____ | 25 | 25 | 25 | 25 | 25 |
| Stearic acid_____do____ | 1 | 1 | 1 | 1 | 1 |
| Zinc oxide_____do____ | 5 | 5 | 5 | 5 | 5 |
| Sulfur_____do____ | 2 | 2 | 2 | 2 | 2 |
| Ethyl zimate [1]_____do____ | 1.5 | 1.5 | 1.5 |  |  |
| Tellurac [2]_____do____ |  |  | 1 | 1.2 | 1.2 |
| DEA.HCl [3]_____do____ |  | 3 |  |  | 1 |
| Modulus 100%_____p.s.i__ | 270 | 290 | 210 | 250 | 270 |
| Modulus 200%_____p.s.i__ | 600 | 620 | 440 | 580 | 590 |
| Modulus 300%_____p.s.i__ | 1,040 | 1,010 | 700 | 1,010 | 950 |
| Tensile_____p.s.i__ | 2,260 | 2,225 | 2,180 | 2,300 | 2,170 |
| Elongation_____percent__ | 585 | 585 | 625 | 585 | 595 |

[1] Zinc diethyldithiocarbamate.
[2] Tellurium diethyldithiocarbamate.
[3] Diethylamine hydrochloride.

The comparison of the effects obtained by the addition of diethylamine hydrochloride to gum and pigment loaded butyl stocks shows that the amine hydrochloride is effective only in the gum stock. This result is even more striking when it is realized that carbon black and other pigments produce a considerable improvement in tensile properties in the case of SBR (formerly GRS rubber) and to a lesser extent in natural rubber but do not improve butyl stocks. (See R. T. Vanderbilt Rubber Handbook, Ninth edition, 1948.)

Example 8

The butyl rubber latex of Example 1 was compounded according to the following recipe:

| | Parts |
|---|---|
| Latex solids | 100 |
| Zinz oxide | 5 |
| Sulfur | 2 |
| Zinc diethyldithiocarbamate | 3 |
| NH₄Cl | 2 |

One portion of the compounded latex was allowed to stand overnight before preparing a film as described in Example 1 and curing at 250°–260° F. for one hour in a hot air circulating oven. Films were prepared from the other portion immediately and cured. The following results were obtained and compared with the cured films obtained in which no NH₄Cl had been included in the recipe:

|  | Control (No NH₄Cl) | | 2 parts NH₄Cl | |
|---|---|---|---|---|
|  | No age | 24 hr. age | No age | 24 hr. age |
| Ultimate tensile | 2,370 | 2,760 | 2,730 | 2,990 |
| Elongation | 1,065 | 1,095 | 1,030 | 970 |

The above data show that improved results are obtained by aging the compounded latex for 24 hours prior to curing, even in the absence of NH₄Cl.

The nature of the present invention having been thus fully set forth and specific examples of the same given, what is claimed as new and useful and desired to be secured by Letters Patent is:

1. Sulfur vulcanized gum butyl rubber copolymer of isobutylene and a small amount of a diolefin, containing 4 to 6 carbon atoms containing as a vulcanization accelerator 1 to 6 parts by wt. of zinc diethyldithiocarbamate per 100 parts by wt. of rubber and 2 to 4 parts by wt. of ammonium chloride per 100 parts by wt. of rubber.

2. In the process of vulcanizing with sulfur gum butyl rubber copolymer of isobutylene and a small amount of a diolefin, containing 4 to 6 carbon atoms, the step which comprises heating a gum butyl stock in the presence of 1 to 6 parts by wt. of zinc diethyldithiocarbamate per 100 parts by wt. of rubber and 2 to 4 parts by wt. of diethylamine hydrochloride.

3. The process of vulcanizing butyl rubber latex copolymer of isobutylene and a small amount of a diolefin, containing 4 to 6 carbon atoms which consist in mixing the latex with 1 to 11 parts by wt. of zinc oxide, 2 parts by wt. of sulfur and 1 to 6 parts by wt. of zinc diethyldithiocarbamate per 100 parts by wt. of rubber and 2 to 4 parts by wt. per 100 parts by wt. of rubber of a compound chosen from the group consisting of ammonium chloride, diethylamine hydrochloride, and dicyclohexylamine hydrochloride, forming a film from said latex and heating said film at 250–260° F. for about one hour.

4. Process according to claim 3 in which the compound is ammonium chloride.

5. Process according to claim 3 in which the compound is dicyclohexylamine hydrochloride.

6. Process according to claim 3 in which the compound is diethylamine hydrochloride.

7. The process of vulcanizing butyl rubber copolymer latex of isobutylene and a small amount of a diolefin, containing 4 to 6 carbon atoms which consist in mixing the latex with 1 to 11 parts by weight of zinc oxide, 2 parts by weight of sulfur and 1 to 6 parts by wt. of zinc diethyldithiocarbamate per 100 parts by wt. of rubber and 2 to 4 parts by wt. per 100 parts by wt.

of rubber of a compound chosen from the group consisting of ammonium chloride, diethylamine hydrochloride, and dicyclohexylamine hydrochloride, maintaining said mixture at room temperature for at least 24 hours, forming a film from said mixture and heating said film at 250–260° F. for about one hour.

8. Process according to claim 7 in which the compound is ammonium chloride.

9. Process according to claim 7 in which the compound is dicyclohexylamine hydrochloride.

10. Process according to claim 7 in which the compound in diethylamine hydrochloride.

References Cited in the file of this patent

UNITED STATES PATENTS

| 2,356,128 | Thomas et al. | Aug. 22, 1944 |
| 2,391,742 | Roberts | Dec. 25, 1945 |

FOREIGN PATENTS

| 743,731 | Great Britain | Jan. 25, 1956 |
| 734,390 | Great Britain | July 27, 1955 |

OTHER REFERENCES

Wilson: "British Compounding Ingredients for Rubber," Heffer & Sons Ltd., Cambridge (1958), pp. 10, 11, 45–47 and 361–362.